United States Patent
Nakamoto et al.

(10) Patent No.: US 12,448,196 B2
(45) Date of Patent: Oct. 21, 2025

(54) PACKAGING CONTAINER

(71) Applicant: DAIWA CAN COMPANY, Tokyo (JP)

(72) Inventors: Hikaru Nakamoto, Sagamihara (JP); Yoshinari Suganuma, Sagamihara (JP); Ichiro Hayashi, Tokyo (JP); Ryuya Nagao, Sagamihara (JP)

(73) Assignee: DAIWA CAN COMPANY, Tokyo (JP)

( * ) Notice: Subject to any disclaimer, the term of this patent is extended or adjusted under 35 U.S.C. 154(b) by 167 days.

(21) Appl. No.: 18/357,595

(22) Filed: Jul. 24, 2023

(65) Prior Publication Data

US 2023/0365315 A1 Nov. 16, 2023

Related U.S. Application Data

(63) Continuation of application No. PCT/JP2022/002424, filed on Jan. 24, 2022.

(30) Foreign Application Priority Data

Jan. 25, 2021 (JP) .................. 2021-009792

(51) Int. Cl.
*B65D 77/30* (2006.01)
*B65D 1/34* (2006.01)
*B65D 77/20* (2006.01)

(52) U.S. Cl.
CPC ........... *B65D 77/2024* (2013.01); *B65D 1/34* (2013.01)

(58) Field of Classification Search
CPC .. B65D 1/34; B65D 77/2024; B65D 77/2032; B65D 77/2036; B65D 2251/0031; B65D 2577/2066; B29C 65/76

(Continued)

(56) References Cited

U.S. PATENT DOCUMENTS 5,316,603 A * 5/1994 Akazawa .......... B29C 66/81425
  156/580.2
6,843,042 B2 * 1/2005 Nakabayashi .......... B29C 65/76
  53/485

(Continued)

FOREIGN PATENT DOCUMENTS

DE 202015000579 U1 3/2015
EP 3202687 A1 8/2017

(Continued)

OTHER PUBLICATIONS

Translation JP 6197166 (Year: 2025).*

(Continued)

*Primary Examiner* — Gideon R Weinerth
(74) *Attorney, Agent, or Firm* — Polsinelli LLP

(57) ABSTRACT

A packaging container (1) includes a housing part (21) that houses a content, a flange part (22) provided on an outer circumference of an opening of the housing part (21) integrally with the housing part (21), a sealing ridge (23) provided on a top face of the flange part (22), annularly formed over an entire circumference of the flange part (22) so as to be protruded upward, and having a first protrusion (23a) that protrudes outward in a plane direction of the flange part (22) at a position corresponding to an opening start part, and a second protrusion (24) provided on the top face of the flange part (22) so as to be protruded upward, and forming a gap along an inner face of the first protrusion (23a) on an inner circumferential side of the first protrusion (23a) of the sealing ridge (23).

16 Claims, 5 Drawing Sheets

(58) Field of Classification Search
USPC .................. 220/359.4, 657; 156/69; 206/557
See application file for complete search history.

(56) References Cited

U.S. PATENT DOCUMENTS

| | | | | |
|---|---|---|---|---|
| 9,023,411 | B2* | 5/2015 | Maatta | B65D 77/2024 426/106 |
| 11,628,032 | B2* | 4/2023 | Hayden | B65D 77/2024 206/438 |
| 2003/0057111 | A1* | 3/2003 | Ichikawa | B65D 77/2032 206/210 |
| 2013/0202826 | A1* | 8/2013 | Romeiro | B65D 43/0202 428/35.8 |
| 2018/0141692 | A1* | 5/2018 | Hauck | B29C 66/131 |
| 2021/0002018 | A1* | 1/2021 | Derks | B65D 1/40 |
| 2024/0383661 | A1* | 11/2024 | Harrison | B65D 77/2024 |

FOREIGN PATENT DOCUMENTS

| | | |
|---|---|---|
| JP | S6197166 U | 6/1986 |
| JP | 02-63372 | 5/1990 |
| JP | 9-267864 A | 10/1997 |
| JP | 11-292140 A | 10/1999 |
| JP | 2003-54634 A | 2/2003 |
| JP | 2004106865 A | 4/2004 |
| JP | 2006-151475 A | 6/2006 |
| JP | 2009120247 A | 6/2009 |
| JP | 2013-124119 A | 6/2013 |
| JP | 2016-108013 A | 6/2016 |
| WO | 2016163428 A1 | 10/2016 |

OTHER PUBLICATIONS

International Preliminary Report on Patentability issued Jul. 20, 2023 in International Application PCT/JP2022/002424.
Office Action issued Nov. 21, 2024 in European Application 22742711.9.
International Search Report and Written Opinion mailed Mar. 29, 2022 in International Application PCT/JP2022/002424.

* cited by examiner

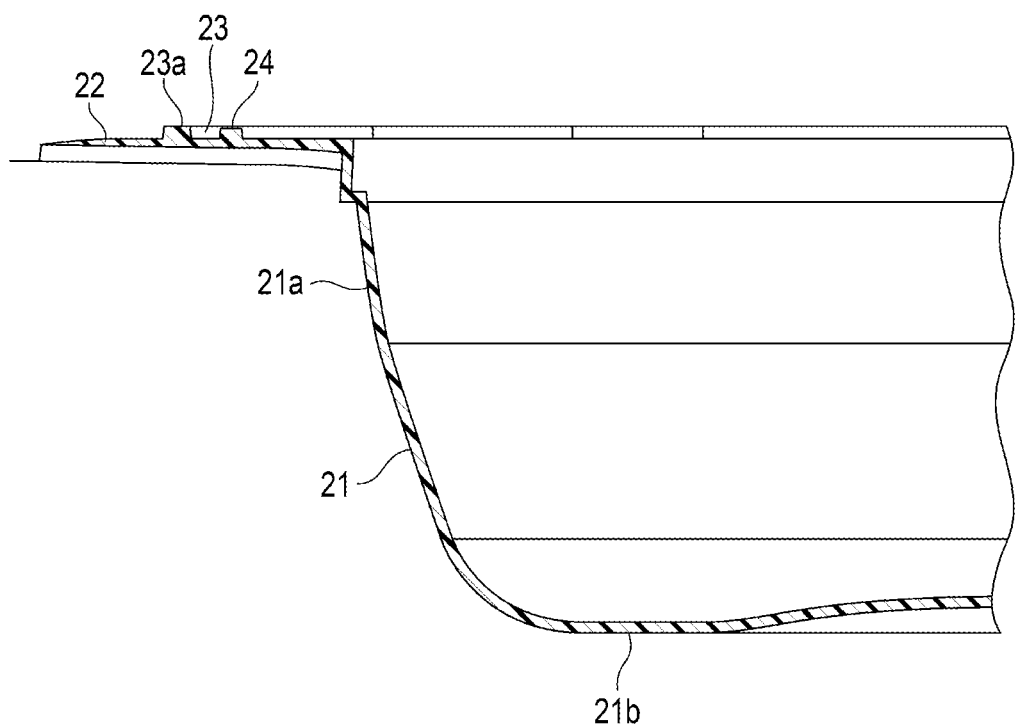
F I G. 3
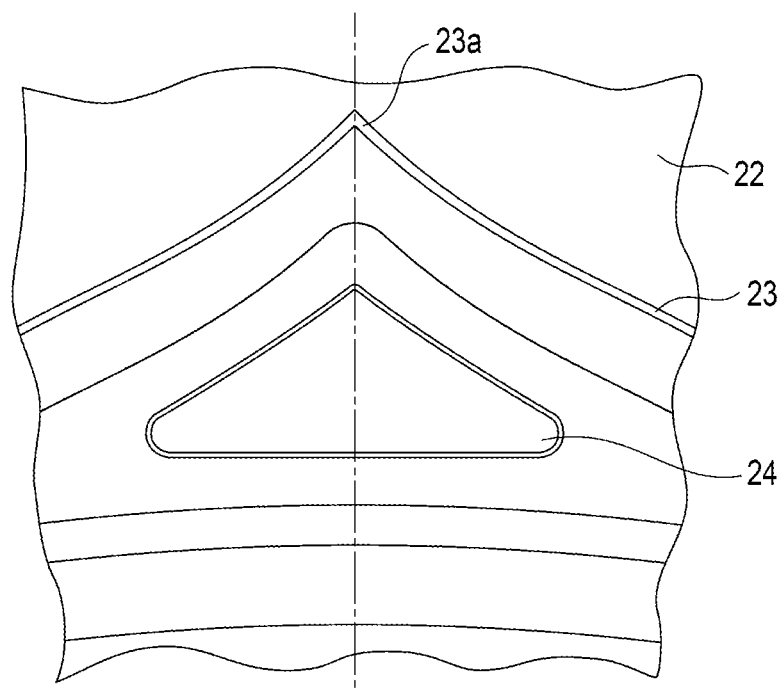
F I G. 4

| No. | Example 1 Triangular shape Height 0.8mm | | Example 2 Triangular shape Height 0.6mm | | Example 3 Dogleg shape Height 0.8mm | | Example 4 Dogleg shape Height 0.6mm | |
|---|---|---|---|---|---|---|---|---|
| | Scattered droplet | Site of adhesion | Scattered droplet | Site of adhesion | Scattered droplet | Site of adhesion | Scattered droplet | Site of adhesion |
| 1 | φ1 | Flange | 4×5 | Finger | φ1 × 3 Droplets | Finger | φ2 | Flange |
| | φ1 | Finger | φ2 | Flange | φ1 × 1 Droplet | Flange | | |
| | φ2 | Beyond flange | φ3 | Flange | | | | |
| 2 | 7×5 | Finger | 4×2 | Flange | None | | None | |
| 3 | φ1.5 | Flange | None | | φ2 × 2 Droplets | Flange | φ2 | Finger |
| | 2×3 | Flange | | | | | φ1 | Flange |
| | 30×2 | Finger | | | | | | |
| 4 | φ2 | Flange | φ3 | Flange | 15×2 | Finger | None | |
| | 5×3 | Finger | 10×3 | Flange | | | | |
| 5 | φ2 | Flange | φ6 | Flange | φ2 | Flange | None | |
| 6 | None | | 4×3 | Flange | φ1 × 3 Droplets | Finger | φ5 | Flange |
| | | | φ2 | Finger | φ1 × 2 Droplets | Flange | φ3 | Flange |
| | | | 8×3 | Finger | | | φ2 | Flange |
| 7 | 8×5 | Flange | φ5 | Flange | 3×5 | Flange | φ4 | Flange |
| 8 | φ2 × 2 Droplets | Finger | φ5 | Flange | φ2 × 2 Droplets | Finger | None | |
| | φ2 | Flange | | | 3×4 | Flange | | |
| 9 | 3×5 | Flange | φ2 | Flange | φ5 | Flange | None | |
| | | | φ2 | Finger | | | | |
| | | | 8×3 | Finger | | | | |
| 10 | None | | φ4 | | None | | 10×5 | Flange |
| Flange/Finger | 13 Droplets | 93% | 16 Droplets | 100% | 18 Droplets | 100% | 8 Droplets | 100% |
| Beyond flange | 1 Droplet | 7% | 0 Droplet | 0% | 0 Droplet | 0% | 0 Droplet | 0% |
| φ2 or smaller | 8 Droplets | 56% | 4 Droplets | 25% | 14 Droplets | 78% | 4 Droplets | 50% |
| Exceeding φ2 | 6 Droplets | 44% | 12 Droplets | 75% | 4 Droplets | 22% | 4 Droplets | 50% |
| Rating | △ | | △ | | ○ | | ○ | |

FIG. 6

| | Example 5 | | Example 6 | | Example 7 | | Comparative example 1 | |
|---|---|---|---|---|---|---|---|---|
| | Dogleg shape (Partially continuous) Height 0.8mm | | Dogleg shape (Partially continuous) Height 0.6mm | | Dogleg shape (Partially continuous) Height 0.86mm | | No anti-splash protrusion | |
| No. | Scattered droplet | Site of adhesion | Scattered droplet | Site of adhesion | Scattered droplet | Site of adhesion | Scattered droplet | Site of adhesion |
| 1 | None | | None | | None | | 15 × 20 | Flange |
| 2 | None | | φ1 | Flange | φ1 | Flange | None | |
| 3 | None | | None | | 1 × 0.5 | Flange | φ1 | Finger |
| 4 | φ1 | Finger | None | | None | | 10 × 20 | Beyond flange |
| | | | | | | | 15 × 20 | Finger |
| 5 | None | | None | | None | | None | |
| 6 | None | | 1.5 × 1 | Flange | None | | φ2 | Beyond flange |
| | | | | | | | φ5 | Beyond flange |
| | | | | | | | 8 × 2 | Finger |
| 7 | None | | None | | None | | 10 × 2 | Finger |
| 8 | None | | None | | None | | 30 × 25 | Finger |
| | | | | | | | 15 × 10 | Beyond flange |
| 9 | φ1 | Flange | None | | None | | φ5 | Finger |
| | | | | | | | φ8 | Flange |
| 10 | None | | None | | None | | 8 × 5 | Finger |
| | | | | | | | φ5 | Flange |
| Flange/Finger | 2 Droplets | 100% | 2 Droplets | 100% | 2 Droplets | 100% | 10 Droplets | 71% |
| Beyond flange | 0 Droplet | 0% | 0 Droplet | 0% | 0 Droplet | 0% | 4 Droplets | 29% |
| φ2 or smaller | 2 Droplets | 100% | 2 Droplets | 100% | 2 Droplets | 100% | 2 Droplets | 14% |
| Exceeding φ2 | 0 Droplet | 0% | 0 Droplet | 0% | 0 Droplet | 0% | 12 Droplets | 86% |
| Rating | ◎ | | ◎ | | ◎ | | × | |

F I G. 7

PACKAGING CONTAINER

CROSS-REFERENCE TO RELATED APPLICATION

This application is a Continuation Application of PCT Application No. PCT/JP2022/002424, filed Jan. 24, 2022 and based upon and claiming the benefit of priority from Japanese Patent Application No. 2021-009792, filed Jan. 25, 2021, the entire contents of all of which are incorporated herein by reference.

FIELD

The present invention relates to a packaging container, to which a lid is sealed on a flange part thereof.

BACKGROUND

A packaging container for food, beverage or the like having been widely used has a plastic cup, which is a container obtained by forming a monolayer or multilayer plastic sheet into a flanged cup typically by means of vacuum molding or pressure forming; and a lid member heat-sealed to the flange part. As this sort of container, a packaging container has been proposed in Jpn. UM Appln. KOKAI Publication No. H02-063372 in which the flange part has a protruding sealing ridge on which the lid member is sealed aimed at enhancing heat sealability, and has an "open-here" part (beak part) which is chevron shape in a plan view for easy opening.

PATENT LITERATURE

Patent Literature 1: Jpn. UM Appln. KOKAI Publication No. H02-063372

SUMMARY

The prior packaging container, when housing a liquid-containing content, would have the liquid in the content trapped in a space between the "open-here" part of the packaging container body and the heat-sealed lid, to form a liquid pool. There has been an issue that the liquid trapped in the liquid pool would have scattered to the outside, when opening the lid.

Some of recent foods for those with swallowing difficulty, under increasing need, have been sold while being filled in this sort of container. In particular, the foods for those with swallowing difficulty, to be filled in the container, a seasoning liquid to be filled together with a solid food is imparted with viscosity and thickened by adding, for example, a thickener to the seasoning liquid. The thickened seasoning liquid is more likely to form the liquid pool, making the liquid more likely to be scattered.

It is therefore an object of the present invention to provide a packaging container, capable of suppressing the liquid from scattering upon opening the lid.

BRIEF DESCRIPTION OF THE DRAWINGS

FIG. 3 is a cross-sectional view illustrating an essential structure of the container body.

FIG. 4 is a plan view illustrating an essential structure of an Example of the container body.

FIG. 6 is an explanatory chart summarizing results of an evaluation test of the packaging containers in Examples.

FIG. 7 is an explanatory chart summarizing results of the evaluation test of the packaging containers in Examples and Comparative Example.

DETAILED DESCRIPTION

According to one aspect of the present invention, a packaging container includes: a housing part that houses a content; a flange part provided on an outer circumference of an opening of the housing part integrally with the housing part; a sealing ridge provided on a top face of the flange part, being annularly formed over an entire circumference of the flange part so as to be protruded upward, and having a first protrusion that protrudes outward in a plane direction of the flange part at a position corresponding to an opening start part; and a second protrusion provided on the top face of the flange part so as to be protruded upward and forming a gap along an inner face of the first protrusion on an inner circumferential side of the first protrusion of the sealing ridge.

Hereinafter, a structure of a packaging container 1 according to an embodiment of the present invention will be described with reference to FIGS. 1 to 7.

Figure 1:
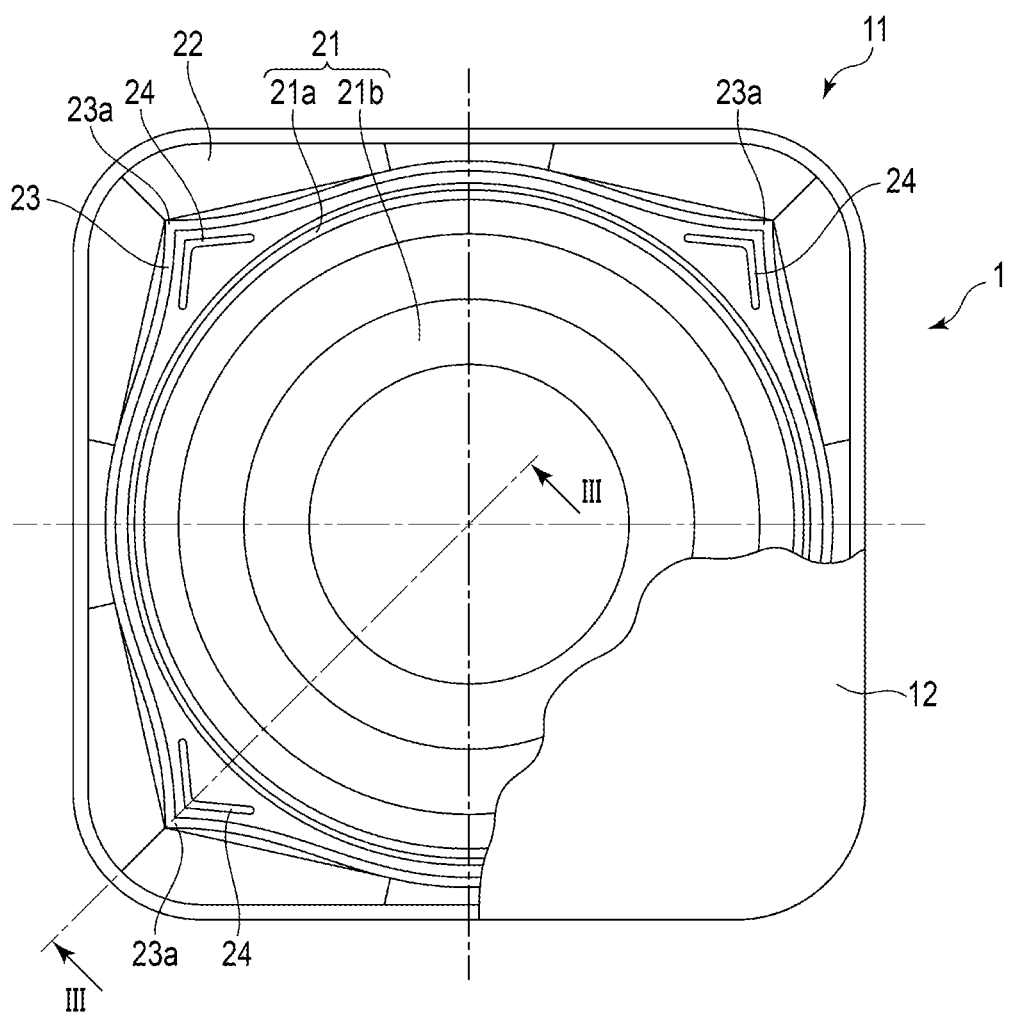
FIG. 1 is a plan view illustrating a structure of a packaging container according to an embodiment of the present invention, with a partial omission.
Figure 2:
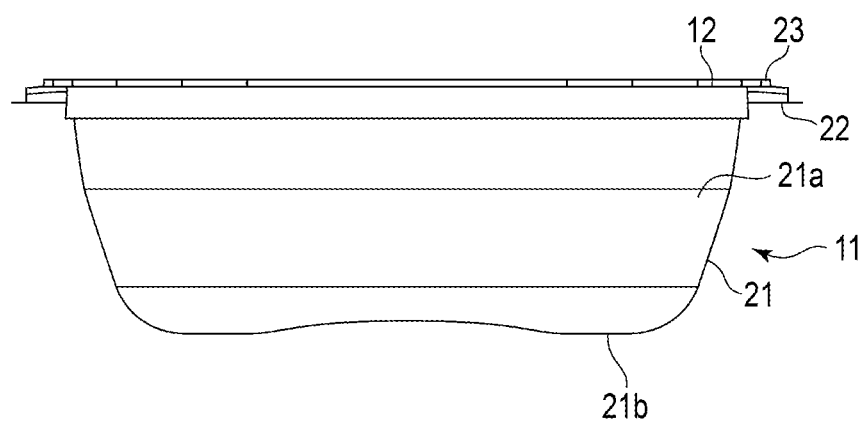
FIG. 2 is a side elevation illustrating a structure of a container body of the packaging container.
Figure 5:
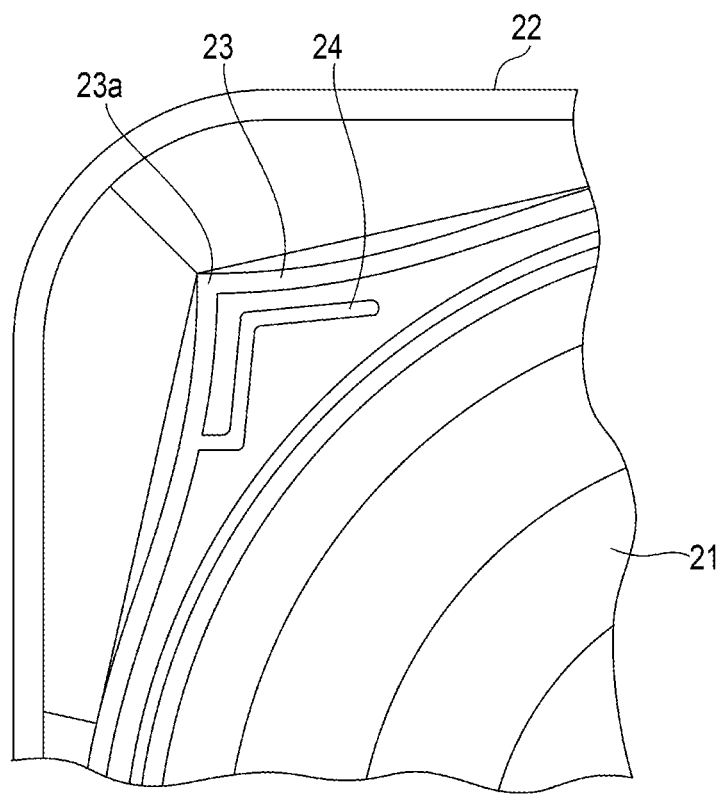
FIG. 5 is a plan view illustrating an essential structure of an Example of the container body.

FIG. 1 is a plan view illustrating a structure of a packaging container 1 according to an embodiment of the present invention, with a lid member 12 partially omitted. FIG. 2 is a side elevation illustrating a structure of a container body 11 of the packaging container 1. FIG. 3 is a cross-sectional view illustrating the container body 11 of the packaging container 1 taken along line III-III in FIG. 1. FIGS. 4 and 5 are enlarged plan views illustrating structures of anti-splash protrusions 24 of the flange part 22 in the individual Examples of the container body 11. FIGS. 6 and 7 are explanatory charts summarizing results of the evaluation test of the packaging containers in the individual Examples and Comparative Example.

As illustrated in FIGS. 1 and 2, the packaging container 1 has a container body 11, and a filmy lid member 12 welded to the container body 11 by heat sealing.

The packaging container 1 houses a content including liquid, while enclosing the content in the container body 11, and sealing the container body 11 with the lid member 12.

As illustrated in FIGS. 1 to 3, the container body 11 has a housing part 21, a flange part 22, a sealing ridge 23, and an anti-splash protrusion 24. The container body 11 is formed by shaping a multilayer thermoplastic resin sheet. That is, the container body 11 has the housing part 21, the flange part 22, the sealing ridge 23, and the anti-splash protrusion 24, which are integrally formed of the thermoplastic resin sheet.

The thermoplastic resin sheet, having been formed into the container body 11 typically by pressure forming or injection molding, may alternatively be formed by any other forming method.

The thermoplastic resin sheet that forms the container body 11 may be formed of a monolayer resin sheet or a multilayer resin sheet, as long as the sealing ridge 23, to which the lid member 12 is heat-sealed, is formed of a heat-sealable resin. Note that the container body 11 preferably has a multilayer structure whose outer layer includes a heat-sealable resin layer. The container body 11 preferably has a gas barrier property, in addition to heat sealability.

In this Example, the container body 11 is formed of a multilayer thermoplastic resin sheet, in which polypropylene surface layers that compose the inner and outer faces, and an intermediate layer made of an ethylene-vinyl alcohol copolymer are laminated while placing adhesive layers in between. The surface layer is obtainable typically with use of heat-sealable olefin-based resin such as polyethylene, polypropylene, ethylene-propylene copolymer, or blend of these materials. The intermediate layer is obtainable typically with use of thermoplastic resin having a gas barrier property, such as Mx nylon, vinylidene chloride-based resin, or nylon-based resin.

The surface layers and the intermediate layer are laminated while placing in between an adhesive layer which includes resin thermally adhesive to both layers, such as acid-modified olefin-based resin, a copolyester-based adhesive resin, or epoxy-modified thermoplastic adhesive resin.

The housing part 21 is configured as a bottomed cylinder such as in the form of dish, bowl or cup. The housing part 21 has a sidewall part 21a and a bottom part 21b. The housing part 21 has a flange part 22 which is integrally formed along the outer circumference of an opening end of the sidewall part 21a. The housing part 21 in this embodiment is typically in the form of a cup whose sidewall part 21a is given in the form of cylinder.

The flange part 22 extends outward from the outer circumference of the opening end of the sidewall part 21a. The flange part 22 is designed to have a contour, such as rectangle, circular or ellipse, or irregular contour such as corner combined with circle. The flange part 22 in this embodiment is shaped with the outer rim formed into square rounded at four corners, and with the inner rim, which corresponds to the opening edge of the housing part 21, formed into circle.

With the bottom part 21b of the housing part 21 directed downward, the flange part 22 has the sealing ridge 23 and the anti-splash protrusion 24, which are protrusions that rise upward. That is, the flange part 22 is formed in the process of forming the container body 11, with the sealing ridge 23 and the anti-splash protrusion 24 concurrently formed on a part of the flange part 22.

The sealing ridge 23 protrudes upward from the main face of the flange part 22. The sealing ridge 23 is formed in an annular shape that is continuous with the top face of the flange part 22. In other words, the sealing ridge 23 extends over the entire circumference of the flange part 22, so as to surround the inner rim of the flange part 22, or, so as to surround the opening end of the housing part 21.

The sealing ridge 23 has a planar top face. The top face of the sealing ridge 23 will have the lid member 12 heat-sealed thereto, and thus welded. The sealing ridge 23, having a predetermined width and height, protrudes upward from the main face of the flange part 22. The width and height of the sealing ridge 23 are appropriately determined according to various conditions including formability, as well as sealability and unsealability of the lid member 12. That is, the sealing face of the sealing ridge 23 is designed to have a predetermined sealing area, thereby achieving good sealability and unsealability. Here, the width of the sealing ridge 23 means a dimension thereof measured in the direction orthogonal to the direction the sealing ridge 23 extends, along the main face of the flange part 22.

The sealing ridge 23 is partially provided with a beak part (first protrusion) 23a, at a position corresponding to an opening start part where the lid member 12 is opened. As shown in FIG. 1, in the present embodiment, the beak part (first protrusion) 23a is provided at each of four positions corresponding to the corners of the square flange part 22 rounded at such corners.

Since the beak part 23a is provided on the sealing ridge 23 at the opening start part where the lid member 12 is opened, so that, if there were only one opening start part, the beak part 23a may only be provided at one point of the sealing ridge 23. That is, the opening start part may appropriately be designed typically depending on the geometry or applications of the packaging container 1, and the beak part 23a is provided at a part of the sealing ridge 23, corresponding to the thus determined opening start part.

The beak part 23a is given in the form of ridge that protrudes outward in the plane direction of the flange part 22. That is, the beak part 23a is a protrusion formed of a part of the sealing ridge 23 that protrudes outward in the radial direction of the opening of the housing part 21. In one specific example, the beak part 23a is formed to have a width and a height equivalent to the width and the height of the sealing ridge 23, with a pointed end. Here, the geometry of the pointed end of the beak part 23a is exemplified by beak, chevron, and dogleg (V-shape).

The beak part 23a does not always necessarily have the pointed end typically in the form of beak or chevron, as long as the shape can concentrate stress onto the end of the beak part, upon pulling off of the lid member 12 heat-sealed to the sealing ridge 23 from the container body 11, and can serve as an origin of opening so as to make it easier to pull off the lid member. That is, the beak part 23a may be appropriately designed so as to have a pointed end to which the force of opening of the lid member 12 may be concentrated, owing to a shrunk area of contact with the lid member 12, upon moving the lid member 12 in the direction of pulling off at the opening start part.

The anti-splash protrusion (second protrusion) 24 is provided on the inner circumferential side of the beak part 23a, while keeping in between a predetermined distance from the beak part 23a. The anti-splash protrusion 24 has a side face that conforms to an inner face (inner side face) of the beak part 23a, and is arranged on the flange part 22, while keeping in between a predetermined gap from the beak part 23a. The gap between the beak part 23a and the anti-splash protrusion 24 typically measures approximately 1 mm.

As a result of arrangement while keeping in between a predetermined gap from the beak part 23a of the sealing ridge 23, the anti-splash protrusion 24 forms the gap along the inner face of the beak part 23a, between itself and the inner circumference side of the beak part 23a.

The top face of the anti-splash protrusion 24 is typically formed flat. The top face of the anti-splash protrusion 24 serves as the sealing face, onto which the lid member 12 is heat-sealed, upon heat sealing of the lid member 12 with the sealing ridge 23.

The anti-splash protrusion 24 may be formed with both ends spaced from the beak part 23a (sealing ridge 23), or with one end spaced from (discontinuous with) the beak part 23a (sealing ridge 23) and with another end continuous with the beak part 23a (sealing ridge 23).

Typically, as illustrated in FIGS. 1 to 3, the anti-splash protrusion 24 is formed in the form of dogleg (V-shape), conforming to the beak part 23a. With such anti-splash protrusion 24 thus applied, the opening start part of the flange part 22 will have a double-beak part given by the beak part 23a and the anti-splash protrusion 24.

Note in a case where the inner side face of the sealing ridge 23 and the side face of the anti-splash protrusion 24 extend in any direction inclined from the main face of the flange part 22, the side face of such anti-splash protrusion 24 may need only to extend in a direction conforming to the direction the beak part 23a extends, allowing difference in the direction of inclination between the inner side face of the beak part 23a and the side face of the anti-splash protrusion 24.

In short, the anti-splash protrusion 24 may only be shaped so that the ridgeline (ridge) closer to the beak part 23a extends in the direction in which the beak part 23a extends.

The height of the anti-splash protrusion 24 is set not higher than the sealing ridge 23 (beak part 23a). The height of the anti-splash protrusion 24 is preferably set lower than the height of the sealing ridge 23 (beak part 23a). The height of the anti-splash protrusion 24 is more preferably set to 67% to 96% of the height of the sealing ridge 23. This is because the anti-splash protrusion 24, with the height set lower than 67% of the height of the sealing ridge 23, will reduce the anti-splash effect, meanwhile with the height set higher than 96% of the height of the sealing ridge 23, will increase the heat-seal strength between the anti-splash protrusion 24 and the lid member 12, thereby degrading the unsealability. That is, with the height of the anti-splash protrusion 24 set to 67% to 96% of the height of the sealing ridge 23, the anti-splash effect will be obtainable, and the adhesive force between the anti-splash protrusion 24 and the lid member 12 will be moderated, making the force no longer resistant to pulling off of the lid member 12, thus enabling smooth pulling off.

In an exemplary case where the height of the sealing ridge 23 is set to 0.9 mm, the height of the anti-splash protrusion 24 is set to 0.6 mm to 0.86 mm. In this exemplary embodiment, the sealing ridge 23 is 0.9 mm high, and the anti-splash protrusion 24 is 0.6 mm high.

The width of the anti-splash protrusion 24 may be appropriately set. The width of the anti-splash protrusion 24 is appropriately set, typically depending on the adhesive force between the lid member 12 and the anti-splash protrusion 24 which are contacted by heat sealing. That is, the width of the anti-splash protrusion 24 is set, depending on the height, area of the top face, or geometry of the anti-splash protrusion 24. Note that the width of the anti-splash protrusion 24 means a dimension thereof measured in the direction orthogonal to the direction the anti-splash protrusion 24 extends, along the main face of the flange part 22. In this exemplary embodiment, the sealing ridge 23 is set to 2.5 mm wide, and the anti-splash protrusion 24 is set to 1.6 mm wide.

Note that the inner side face (inner face) of the sealing ridge 23, and the side face of the anti-splash protrusion 24 opposing to the sealing ridge 23 (beak part 23a) may extend in a direction orthogonal to the main face of the flange part 22, or may extend in any direction inclined from the main face of the flange part 22.

According to the thus configured packaging container 1, the lid member 12, when heat-sealed onto the sealing ridge 23, is heat-sealed both onto the beak part 23a and the anti-splash protrusion 24. This successfully prevents a liquid pool from being formed around the beak part 23a, more specifically, in a gap between the beak part 23a and the anti-splash protrusion 24. That is, with a predetermined gap formed between the beak part 23a and the anti-splash protrusion 24, the lid member 12, when pulled off, is first detached at a part welded with the beak part 23a, while remained welded onto the anti-splash protrusion 24. At this time, the inside of the container body 11 (the gap between the beak part 23a and the anti-splash protrusion 24) communicates with the outside of the container body 11, through which a gas in the container body 11 is released to the outside. Since there is no liquid pool formed around the beak part 23a, so that scattering of the liquid is successfully avoidable during release of the gas in the container body 11.

Upon heat-sealing of the lid member 12 onto the sealing ridge 23, with one end of the anti-splash protrusion 24 continuous with the sealing ridge 23 (beak part 23a), the gap between the beak part 23a and the anti-splash protrusion 24 will become a space with one end closed and another end opened. Hence, the gap (space) between the beak part 23a and the anti-splash protrusion 24, having no way to release the gas, is prevented from intrusion of the liquid that enters the gap, and thus further suppresses formation of the liquid pool around the beak part 23a. In the process of opening, upon pulling off of the lid member 12 from the beak part 23a, the inside of the container body 11 (the gap between the beak part 23a and the anti-splash protrusion 24) instantaneously communicates with the outside of the container body 11 to release the gas in the container body 11, so that liquid splash may be suitably prevented.

Next, exemplary cases of the container body 11 of the packaging container 1 of this embodiment will be explained as Examples 1 to 7, referring to FIGS. 1 to 5. The container bodies 11 of the individual Examples and as the packaging container of Comparative Example, a container body having no anti-splash protrusion 24 were manufactured, and an evaluation test was conducted in the individual Examples and Comparative Example. Results will be explained referring to FIGS. 6 and 7. Note that the container bodies of Examples 1 to 7 and Comparative Example subjected to the evaluation test were manufactured by forming monolayer resin sheets, which were only for the purpose of evaluation test, but not for long-term storage.

Example 1

A container body 11 of Example 1 was manufactured by pressure forming of a 1-mm-thick monolayer resin sheet made of polypropylene into the form of plastic cup having the anti-splash protrusions 24 as illustrated in FIGS. 1 to 3.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21b to the flange part 22.

The sealing ridge 23 was designed to have a height of 0.9 mm above the flange part 22, and a width of 2.5 mm. As illustrated in FIGS. 1 to 3, the sealing ridge 23 was designed to have the beak parts 23a formed at portions corresponding to four corners of the flange part 22.

As illustrated in FIG. 4, the anti-splash protrusion 24 was formed to a triangular (triangular prism) shape, with a width of 1.6 mm, a height of 0.8 mm, and with both ends spaced from the sealing ridge 23. The gap between the beak part 23a and the anti-splash protrusion 24 was set to 1 mm. The side faces of the beak part 23a and the anti-splash protrusion 24 were designed to extend in the direction orthogonal to the flange part 22.

Example 2

A container body 11 of Example 2 was manufactured by pressure forming of a 1-mm-thick monolayer resin sheet made of polypropylene, into the form of plastic cup having the anti-splash protrusions 24 as illustrated in FIGS. 1 to 3.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21b to the flange part 22.

The sealing ridge 23 was designed to have a height of 0.9 mm above the flange part 22, and a width of 2.5 mm. As illustrated in FIGS. 1 to 3, the sealing ridge 23 was designed to have the beak parts 23a formed at portions corresponding to four corners of the flange part 22.

As illustrated in FIG. 4, the anti-splash protrusion 24 was formed to a triangular shape, with a width of 1.6 mm, a height of 0.6 mm, and with both ends spaced from the sealing ridge 23. The gap between the beak part 23a and the anti-splash protrusion 24 was set to 1 mm. The side faces of the beak part 23a and the anti-splash protrusion 24 were designed to extend in the direction orthogonal to the flange part 22.

Example 3

A container body 11 of Example 3 was manufactured by pressure forming of a 1-mm-thick monolayer resin sheet made of polypropylene, into the form of plastic cup having the anti-splash protrusions 24 as illustrated in FIG. 4.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21b to the flange part 22.

The sealing ridge 23 was designed to have a height of 0.9 mm above the flange part 22, and a width of 2.5 mm. As illustrated in FIG. 4, the sealing ridge 23 was designed to have the beak parts 23a formed at portions corresponding to four corners of the flange part 22.

As illustrated in FIGS. 1 to 3, the anti-splash protrusion 24 was formed in a dogleg shape, with a width of 1.6 mm, a height of 0.8 mm, and with both ends spaced from the sealing ridge 23. The gap between the beak part 23a and the anti-splash protrusion 24 was set to 1 mm. The side faces of the beak part 23a and the anti-splash protrusion 24 were designed to extend in the direction orthogonal to the flange part 22.

Example 4

A container body 11 of Example 4 was manufactured by pressure forming of a 1-mm-thick monolayer resin sheet made of polypropylene, into the form of plastic cup having the anti-splash protrusions 24 as illustrated in FIG. 4.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21b to the flange part 22.

The sealing ridge 23 was designed to have a height of 0.9 mm above the flange part 22, and a width of 2.5 mm. As illustrated in FIG. 4, the sealing ridge 23 was designed to have the beak parts 23a formed at portions corresponding to four corners of the flange part 22.

As illustrated in FIGS. 1 to 3, the anti-splash protrusion 24 was formed in a dogleg shape, with a width of 1.6 mm, a height of 0.6 mm, and with both ends spaced from the sealing ridge 23. The gap between the beak part 23a and the anti-splash protrusion 24 was set to 1 mm. The side faces of the beak part 23a and the anti-splash protrusion 24 were designed to extend in the direction orthogonal to the flange part 22.

Example 5

A container body 11 of Example 5 was manufactured by pressure forming of a 1-mm-thick monolayer resin sheet made of polypropylene, into the form of plastic cup having the anti-splash protrusions 24 as illustrated in FIG. 5.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21b to the flange part 22.

The sealing ridge 23 was designed to have a height of 0.9 mm above the flange part 22, and a width of 2.5 mm. As illustrated in FIG. 5, the sealing ridge 23 was designed to have the beak parts 23a formed at portions corresponding to four corners of the flange part 22.

As illustrated in FIG. 5, the anti-splash protrusion 24 was formed in a dogleg shape, with a width of 1.6 mm, a height of 0.8 mm, with one end spaced from the sealing ridge 23, and another end continuous with the sealing ridge 23. The gap between the beak part 23a and the anti-splash protrusion 24 was set to 1 mm. The side faces of the beak part 23a and the anti-splash protrusion 24 were designed to extend in the direction orthogonal to the flange part 22.

Example 6

A container body 11 of Example 6 was manufactured by pressure forming of a 1-mm-thick monolayer resin sheet made of polypropylene, into the form of plastic cup having the anti-splash protrusions 24 as illustrated in FIG. 5.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21b to the flange part 22.

The sealing ridge 23 was designed to have a height of 0.9 mm above the flange part 22, and a width of 2.5 mm. As illustrated in FIG. 5, the sealing ridge 23 was designed to have the beak parts 23a formed at portions corresponding to four corners of the flange part 22.

As illustrated in FIG. 5, the anti-splash protrusion 24 was formed in a dogleg shape, with a width of 1.6 mm, a height of 0.6 mm, with one end spaced from the sealing ridge 23, and another end continuous with the sealing ridge 23. The gap between the beak part 23a and the anti-splash protrusion 24 was set to 1 mm. The side faces of the beak part 23a and the anti-splash protrusion 24 were designed to extend in the direction orthogonal to the flange part 22.

Example 7

A container body 11 of Example 7 was manufactured by pressure forming of a 1-mm-thick monolayer resin sheet made of polypropylene, into the form of plastic cup having the anti-splash protrusions 24 as illustrated in FIG. 5.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21*b* to the flange part 22.

The sealing ridge 23 was designed to have a height of 0.9 mm above the flange part 22, and a width of 2.5 mm. As illustrated in FIG. 5, the sealing ridge 23 was designed to have the beak parts 23*a* formed at portions corresponding to four corners of the flange part 22.

As illustrated in FIG. 5, the anti-splash protrusion 24 was formed in a dogleg shape, with a width of 1.6 mm, a height of 0.86 mm, with one end spaced from the sealing ridge 23, and another end continuous with the sealing ridge 23. The side faces of the beak part 23*a* and the anti-splash protrusion 24 were designed to extend in a direction inclined from the flange part 22, with the distance between the beak part 23*a* and the anti-splash protrusion 24 set to 1 mm at the top end of the beak part 23*a*.

Comparative Example

A container body of Comparative Example was manufactured by pressure forming of a 1-mm-thick monolayer resin sheet made of polypropylene, into the form of plastic cup configured similarly to those in the individual Examples, except for having no anti-splash protrusions 24.

The outer contour of the flange part 22 was a 114-mm-square with the corners rounded with a radius of curvature of 18 mm. The housing part 21 was designed to have an opening with a shape of 98-mm-diameter circle, and to have a height of 36 mm, when measured from the bottom part 21*b* to the flange part 22.

The sealing ridge 23 was designed to have a height of 0.9 mm above the flange part 22, and a width of 2.5 mm. As illustrated in FIGS. 1 to 3, the sealing ridge 23 was designed to have the beak parts 23*a* formed at portions corresponding to four corners of the flange part 22.

(Evaluation Test)

For the evaluation test, a viscous liquid prepared by adding a thickener to water to adjust the viscosity, was filled in the container body of Examples 1 to 7, and Comparative Example. The viscous liquid was adjusted to have a viscosity of 1500 mPa s, as a value measured with a B-type viscometer (20° C.±2° C., rotor speed 12 rpm, 120 seconds). The viscous liquid was filled in each cup, so as to leave a head space of 10 mm high.

The lid member 12 was then heat-sealed onto the sealing ridge 23 of the container body, to accomplish tight closure. The lid members 12 in Examples 1 to 7 were also heat-sealed onto the anti-splash protrusion 24. The layer structure of the lid member 12 was PET/adhesive layer (modified polypropylene)/unstretched polypropylene. After sealing the container body by heat-sealing the lid member 12 onto the container body, the container body was placed upside down and allowed to stand with the lid member 12 laid at the bottom, to form a liquid pool in the gap between the flange part 22 and the lid member 12.

Ten each of such samples were prepared for each of Examples 1 to 7 and Comparative Example, and then subjected to an opening test.

In the opening test, the lid member 12 was pulled off by hands, and size and scatter range of liquid droplets scattered during the pulling-off were measured. The scatter range was determined by counting the number of droplets that adhered to the flange part 22 outside the sealing ridge 23 or to the finger, and that scattered beyond the flange part 22. The number of droplets were counted while classifying them into those having a diameter of 2 mm or smaller, and those having a diameter exceeding 2 mm.

The size of the scattered droplets was denoted by diameter for circular droplets, and by long diameter and short diameter for non-circular droplets such as the elliptic droplets.

(Results of Evaluation Test)

Results of the evaluation test were summarized in FIGS. 6 and 7. The container body of Comparative Example 1, having no anti-splash protrusion 24, caused four droplets (29%) scattered beyond the flange part 22, and twelve droplets (86%) having the diameter exceeding 2 mm. As is clear from the results, large droplets were scattered beyond the flange part 22, clearly indicating that the container body could not suppress the liquid from being scattered. The container body of Comparative Example 1 was thus rated as "x" in terms of liquid splash.

Example 1 caused one droplet (7%) scattered beyond the flange part 22, and caused six droplets (44%) having the diameter exceeding 2 mm. Example 1 was able to suppress the droplets from scattering as compared with Comparative Example 1, and apparently produced smaller droplets. The container body 11 of Example 1 was thus rated as "Δ" in terms of liquid splash.

Example 2 caused twelve droplets having the diameter exceeding 2 mm, which amounted same as the number of over-2 mm droplets in Comparative Example, but with a reduced ratio of the over-2 mm droplets to the total resulted droplets down to 75%, as compared with that in Comparative Example 1. Example 2 was also found to cause no droplets scattered beyond the flange part 22, indicating that the scattering was further suppressed than in Comparative Example 1. The container body 11 of Example 2 was thus rated as "Δ" in terms of liquid splash.

Example 3 caused no droplets scattered beyond the flange part 22, and caused only four over-2 mm droplets, indicating that the scattering was well suppressed. The container body 11 of Example 3 was thus rated as "○" in terms of liquid splash. Example 4 caused no droplets scattered beyond the flange part 22, caused only four over-2 mm droplets, and eight in total scattered droplets, indicating that the scattering was most well suppressed among Examples 1 to 4. The container body 11 of Example 4 was thus rated as "o" in terms of liquid splash.

Examples 5 to 7 caused no droplets scattered beyond the flange part 22, caused no over-2 mm droplets, indicating that the scattering was excellently suppressed. The container bodies 11 of Examples 5 to 7 were thus rated as "◎" in terms of liquid splash.

From these results of the evaluation tests on the individual Examples, it is obvious that the packaging container 1 having the anti-splash protrusion 24 according to this embodiment can suppress the liquid splashing, compared to the prior container body having no anti-splash protrusion 24 formed on the packaging container.

As described above, in the packaging container 1 according to an embodiment of the present invention, the beak part 23*a* is provided on the sealing ridge 23 formed on the flange part 22, at a position corresponding to an opening start part; and has the anti-splash protrusion 24, whose ridgeline extends conforming to the beak part 23*a*, provided on the inner circumferential side of the beak part 23*a*. With this configuration, the packaging container 1 can prevent liquid splashing, when opening the container body 11.

Note that the present invention is not limited to the above-described embodiment. For example, the housing part 21 is not limited to the bottomed cylindrical shape, but may alternatively be shaped in a bottomed rectangular tube or in other form. The housing part 21 may have a constant diameter, or may have partially different diameters as illustrated in FIG. 2, or the diameter may be configured to gradually shrink.

The housing part 21 may alternatively be formed in a tubular shape which is open ended at both ends, with the flange parts 22 formed at both ends. That is, a possible packaging container 1 may have the lid members 12 heat-sealed onto the sealing ridges 23 and the anti-splash protrusions 24 of the flange parts 22, at both ends of the housing part 21. Having described the packaging container 1 typically configured to have the container body 11 and the lid member 12 for convenience of explanation, the container body 11 may alternatively be understood as the packaging container. That is, the container body 11 may be the packaging container which is configured to have no lid member 12. This is because in some cases the container body 11 and the lid member 12 would be manufactured in different sites, or, filling of the content into the container body 11 and heat-sealing of the lid member 12 may take place at a site different from a site where the container body 11 was manufactured. That is, the container body 11 may of course be used as a trading form delivered as the packaging container.

Note that the present invention is not limited to the aforementioned embodiment, and may be modified, when implemented, in various ways without departing from the gist thereof. The individual embodiments may be implemented in appropriate combination, from which a combined effect will be obtainable. The aforementioned embodiment includes various inventions, from which various inventions are extractable according to combinations of a plurality of disclosed constituent features.

For example, even a configuration, having some of the constituent features thereof deleted from the whole structural features depicted in the embodiment, is extractable as the invention, so long as the problem may be solved, and the effect is obtainable.

REFERENCE SIGNS LIST

1 packaging container
11 container body
12 lid member
21 housing part
21*a* sidewall part
21*b* bottom part
22 flange part
23 sealing ridge
23*a* beak part (first protrusion)
24 anti-splash protrusion (second protrusion)

The invention claimed is:

1. A packaging container comprising:
a housing part that houses a content;
a flange part provided on an outer circumference of an opening of the housing part integrally with the housing part;
a sealing ridge provided on a top face of the flange part, annularly formed over an entire circumference of the flange part so as to be protruded upward, and having a first protrusion that protrudes outward in a plane direction of the flange part at a position corresponding to an opening start part, wherein the first protrusion has a pointed end; and
a second protrusion provided on the top face of the flange part so as to be protruded upward, and forming a gap along an inner face of the first protrusion on an inner circumferential side of the first protrusion of the sealing ridge, wherein the second protrusion is formed conforming to the first protrusion, the second protrusion being a dogleg shaped ridge, wherein the second protrusion has one end continuous with the first protrusion, and another end discontinuous with the first protrusion.

2. The packaging container according to claim 1, wherein a height of the second protrusion, above the top face of the flange part, is lower than a height of the first protrusion above the top face of the flange part.

3. The packaging container according to claim 1, wherein a height of the second protrusion, above the top face of the flange part, is lower than a height of the first protrusion above the top face of the flange part.

4. The packaging container according to claim 3, further comprising a lid member that is heat-sealed to the sealing ridge.

5. The packaging container according to claim 1, further comprising a lid member that is heat-sealed to the sealing ridge.

6. The packaging container according to claim 1, further comprising a lid member that is heat-sealed to the sealing ridge.

7. A packaging container comprising:
a housing part that houses a content;
a flange part provided on an outer circumference of an opening of the housing part integrally with the housing part;
a sealing ridge provided on a top face of the flange part, annularly formed over an entire circumference of the flange part so as to be protruded upward, and having a first protrusion that protrudes outward in a plane direction of the flange part at a position corresponding to an opening start part, wherein the first protrusion has a pointed end; and
a second protrusion provided on the top face of the flange part so as to be protruded upward, and forming a gap along an inner face of the first protrusion on an inner circumferential side of the first protrusion of the sealing ridge, wherein the second protrusion is formed conforming to the first protrusion, the second protrusion having a triangular prism shape.

8. The packaging container according to claim 7, wherein a height of the second protrusion, above the top face of the flange part, is lower than a height of the first protrusion above the top face of the flange part.

9. The packaging container according to claim 8, further comprising a lid member that is heat-sealed to the sealing ridge.

10. The packaging container according to claim 7, further comprising a lid member that is heat-sealed to the sealing ridge.

11. A packaging container comprising:
a housing part that houses a content;
a flange part provided on an outer circumference of an opening of the housing part integrally with the housing part;
a sealing ridge provided on a top face of the flange part, annularly formed over an entire circumference of the flange part so as to be protruded upward, and having a first protrusion that protrudes outward in a plane direction of the flange part at a position corresponding to an opening start part; and
a second protrusion provided on the top face of the flange part so as to be protruded upward, and forming a gap along an inner face of the first protrusion on an inner circumferential side of the first protrusion of the sealing ridge, wherein a height of the second protrusion, above the top face of the flange part, is lower than a height of the first protrusion above the top face of the flange part.

12. The packaging container according to claim 11, further comprising a lid member that is heat-sealed to the sealing ridge.

13. The packaging container according to claim 11, wherein the first protrusion has a pointed end, and the second protrusion is formed conforming to the first protrusion.

14. The packaging container according to claim 13, wherein the second protrusion is a dogleg shaped ridge.

15. The packaging container according to claim 14, further comprising a lid member that is heat-sealed to the sealing ridge.

16. The packaging container according to claim 13, further comprising a lid member that is heat-sealed to the sealing ridge.

\* \* \* \* \*